(12) United States Patent
Kalvakunta et al.

(10) Patent No.: US 12,355,298 B2
(45) Date of Patent: Jul. 8, 2025

(54) CLOUD BASED LI-ION BATTERY LIFE OPTIMIZATION UTILIZATION WITH HYBRID MODE OF OPERATION

(71) Applicant: SCHNEIDER ELECTRIC IT CORPORATION, Foxboro, MA (US)

(72) Inventors: Murali Krishna Kalvakunta, Bangalore (IN); Pradeep Tolakanahalli Nagabhushanrao, Bangalore (IN); Himamshu V Prasad, Tewksbury, MA (US)

(73) Assignee: SCHNEIDER ELECTRIC IT CORPORATION, Foxboro, MA (US)

(*) Notice: Subject to any disclaimer, the term of this patent is extended or adjusted under 35 U.S.C. 154(b) by 488 days.

(21) Appl. No.: 17/809,568

(22) Filed: Jun. 29, 2022

(65) Prior Publication Data

US 2024/0006909 A1    Jan. 4, 2024

(51) Int. Cl.
*H02J 9/06* (2006.01)
(52) U.S. Cl.
CPC .............. *H02J 9/061* (2013.01); *H02J 9/068* (2020.01)
(58) Field of Classification Search
CPC ........ H02J 9/061; H02J 9/068; H02J 2300/10; H02J 9/066; H02J 9/08; H02J 9/062; H02J 9/06
See application file for complete search history.

(56) References Cited

U.S. PATENT DOCUMENTS

| | | |
|---|---|---|
| 6,330,174 B1 | 12/2001 | Yeah |
| 8,670,872 B2 | 3/2014 | Rasmussen et al. |
| 9,203,323 B2 | 12/2015 | West |
| 9,225,202 B1 | 12/2015 | Kim et al. |
| 10,224,742 B2 | 3/2019 | Brooks |
| 2009/0152951 A1 | 6/2009 | Algrain |
| 2011/0304211 A1 | 12/2011 | Peterson et al. |
| 2015/0180367 A1 | 6/2015 | Tesch |

(Continued)

FOREIGN PATENT DOCUMENTS

| | | |
|---|---|---|
| EP | 4307523 A1 | 1/2024 |
| WO | 2009012451 A2 | 1/2009 |
| WO | WO-2022159057 A1 * | 7/2022 |

OTHER PUBLICATIONS

Extended European Search Report from corresponding European Application No. 23180293.5 dated Dec. 19, 2023.

*Primary Examiner* — Yuhui R Pan
(74) *Attorney, Agent, or Firm* — Lando & Anastasi, LLP

(57) ABSTRACT

According to aspects of the disclosure, an uninterruptible power supply (UPS) system is presented, the UPS System comprising at least one first input configured to be coupled to a primary power source and to a secondary power source, a second input configured to be coupled to a backup power source, an output configured to be coupled to at least one load, and at least one controller configured to receive a signal indicating that the secondary power source is prepared to provide secondary power to the UPS system, determine, responsive to receiving the signal, whether an energy level of the backup power source is above a threshold energy level, and control, responsive to determining that the energy level of the backup power source is above the threshold energy level, the UPS system to provide output power derived from the backup power source to the output.

21 Claims, 5 Drawing Sheets

(56) References Cited

U.S. PATENT DOCUMENTS

| | | | |
|---|---|---|---|
| 2015/0340864 A1* | 11/2015 | Compton | H02J 3/00 |
| | | | 307/66 |
| 2017/0070074 A1* | 3/2017 | Sugeno | H02J 9/062 |
| 2018/0123387 A1 | 5/2018 | Totani et al. | |
| 2019/0020284 A1 | 1/2019 | Danforth, III et al. | |
| 2021/0135489 A1 | 5/2021 | Stites-Clayton et al. | |
| 2021/0191892 A1* | 6/2021 | Yu | H02J 3/0073 |
| 2022/0069613 A1 | 3/2022 | Reddy et al. | |

* cited by examiner

CLOUD BASED LI-ION BATTERY LIFE OPTIMIZATION UTILIZATION WITH HYBRID MODE OF OPERATION

BACKGROUND

1. Field of the Disclosure

At least one example in accordance with the present disclosure relates generally to uninterruptible power supplies.

2. Discussion of Related Art

Power devices, such as uninterruptible power supplies (UPSs), may be used to provide uninterrupted power for sensitive and/or critical loads, such as computer systems and other data-processing systems. Existing UPSs include online UPSs, offline UPSs, line-interactive UPSs, as well as others. UPS s may provide output power to a load. The output power may be derived from a primary source of power, such as a utility-mains source, and/or derived from a backup source of power, such as an energy-storage device.

SUMMARY

According to at least one aspect of the present disclosure, an uninterruptible power supply (UPS) system is provided, the UPS system comprising at least one first input configured to be coupled to a primary power source and to a secondary power source, a second input configured to be coupled to a backup power source, an output configured to be coupled to at least one load, and at least one controller configured to: receive a signal indicating that the secondary power source is prepared to provide secondary power to the UPS system, determine, responsive to receiving the signal, whether an energy level of the backup power source is above a threshold energy level, and control, responsive to determining that the energy level of the backup power source is above the threshold energy level, the UPS system to provide output power derived from the backup power source to the output. In some examples of the UPS system, the at least one controller being further configured to control, responsive to determining that the energy level of the backup power source is below the threshold energy level, the UPS system to provide power derived from the secondary power source to the output. In various examples of the UPS system, the UPS system further comprises a power-factor-correction circuit (PFC) coupled to the at least one first input, wherein the at least one controller is further configured to control, responsive to determining than the energy level of the backup power source is above the threshold energy level, the PFC to be in a deactivated state. In at least one example of the UPS system, the at least one controller being further configured to control, responsive to determining that the energy level of the backup power source is below the threshold energy level, the PFC to be in an activated state.

In some examples of the UPS system, the at least one controller is further configured to determine a power drawn by the at least one load, and control the UPS system to provide output power derived from the backup power source to the at least one load responsive to receiving the signal, determining that the energy level of the backup power source is above the threshold energy level, and determining that the power drawn by the at least one load is below a threshold load level. In various examples of the UPS system, the threshold energy level is a first threshold energy level, and wherein the at least one controller is further configured to control, responsive to determining that the energy level of the UPS system is below a second threshold energy level, the UPS system to discontinue providing output power derived from the backup power source to the at least one load and to begin providing output power derived from the secondary power source to the at least one load. In at least one example of the UPS system, the at least one controller is further configured to update at least one of the first threshold energy level or the second threshold energy level based on at least one operational parameter of the UPS system.

According to at least one aspect of the present disclosure, a non-transitory computer-readable medium storing sequences of computer-executable instructions for operating an uninterruptible power supply (UPS) system is presented, the UPS system having at least one first input coupled to a primary power source and a secondary power source, a second input coupled to a backup power source, and an output, the sequences of computer-executable instructions including instructions that instruct at least one processor to determine, responsive to receiving a signal indicating that the secondary power source is prepared to provide secondary power to at least one load, an energy level of the backup power source, determine, responsive to receiving the signal, whether the energy level of the backup power source is above a threshold energy level, and control, responsive to determining that the energy level of the backup power source is above the threshold energy level, the UPS system to provide output power derived from the backup power source to the at least one load.

In some examples of the non-transitory computer-readable medium, the instructions further instructing the at least one processor to control the UPS system, responsive to determining that the energy level of the backup power source is below the threshold energy level, to provide power derived from the secondary power source to the output. In various examples of the non-transitory computer-readable medium, the instructions further instructing the at least one processor to disable, responsive to determining that the energy level of the backup power source is above the threshold energy level, a power factor correction circuit (PFC) coupled to the at least one first input. In at least one example of the non-transitory computer-readable medium, the instructions further instructing the at least one processor to enable the PFC responsive to determining that the energy level of the backup power source is below the threshold energy level.

In various examples of the non-transitory computer-readable medium, the instructions further instructing the at least one processor to determine a power drawn by the at least one load, and control the UPS system to provide output power derived from the backup power source to the output responsive to receiving the signal indicating that the secondary power source is prepared to provide power to the at least one load, determining that the energy level of the backup power source is above the threshold energy level, and determining that the power drawn by the at least one load is below a threshold load level. In some examples of the non-transitory computer-readable medium, wherein the threshold energy level is a first threshold energy level, the instructions further instructing the at least one processor to control, responsive to determining that the energy level of the UPS system is below a second threshold energy level, the UPS system to discontinue providing power derived from the backup power source to the at least one load, and provide power derived from the secondary power source to the at least one load. In at least one example of the non-transitory computer-readable medium, the instructions further instructing the at least one processor to update at least one of the first threshold energy level or the second threshold energy level based on at least one operational parameter of the UPS system.

According to at least one aspect of the disclosure, a method for operating an uninterruptible power supply (UPS) system is presented, the UPS system having at least one first input configured to be coupled to a primary power source and to a secondary power source, a second input configured to be coupled to a backup power source, and an output configured to be coupled to at least one load, the method comprising receiving a signal indicating that the secondary power source is prepared to provide secondary power to the at least one first input, determining, responsive to receiving the signal, whether an energy level of the backup power source is above a threshold energy level, and providing, responsive to determining that the energy level of the backup power source is above the threshold energy level, output power derived from the backup power source to the output. In some examples the method further comprises providing power derived from the secondary power source to the output responsive to determining that the energy level of the backup power source is below the threshold energy level. In various examples, the method further comprises deactivating a power factor correction circuit (PFC) coupled to the at least one first input responsive to determining that the energy level of the backup power source is above the threshold energy level. In at least one example, the method further comprises enabling the PFC responsive to determining that the energy level of the backup power source is below the threshold energy level. In some examples, the method further comprises determining a power drawn by the at least one load, and providing output power derived from the backup power source to the output responsive to receiving the signal, determining that the energy level of the backup power source is above the threshold energy level, and determining that the power drawn by the at least one load is below a threshold load level.

In some examples of the method, the threshold energy level is a first threshold energy level, and the method further comprises discontinuing, responsive to determining that the energy level of the UPS system is below a second threshold energy level, providing power derived from the backup power source to the at least one load, and providing output power derived from the secondary power source to the at least one load. In various examples, the method further comprises updating at least one of the first threshold energy level or second threshold energy level based on at least one operational parameter of the UPS system.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
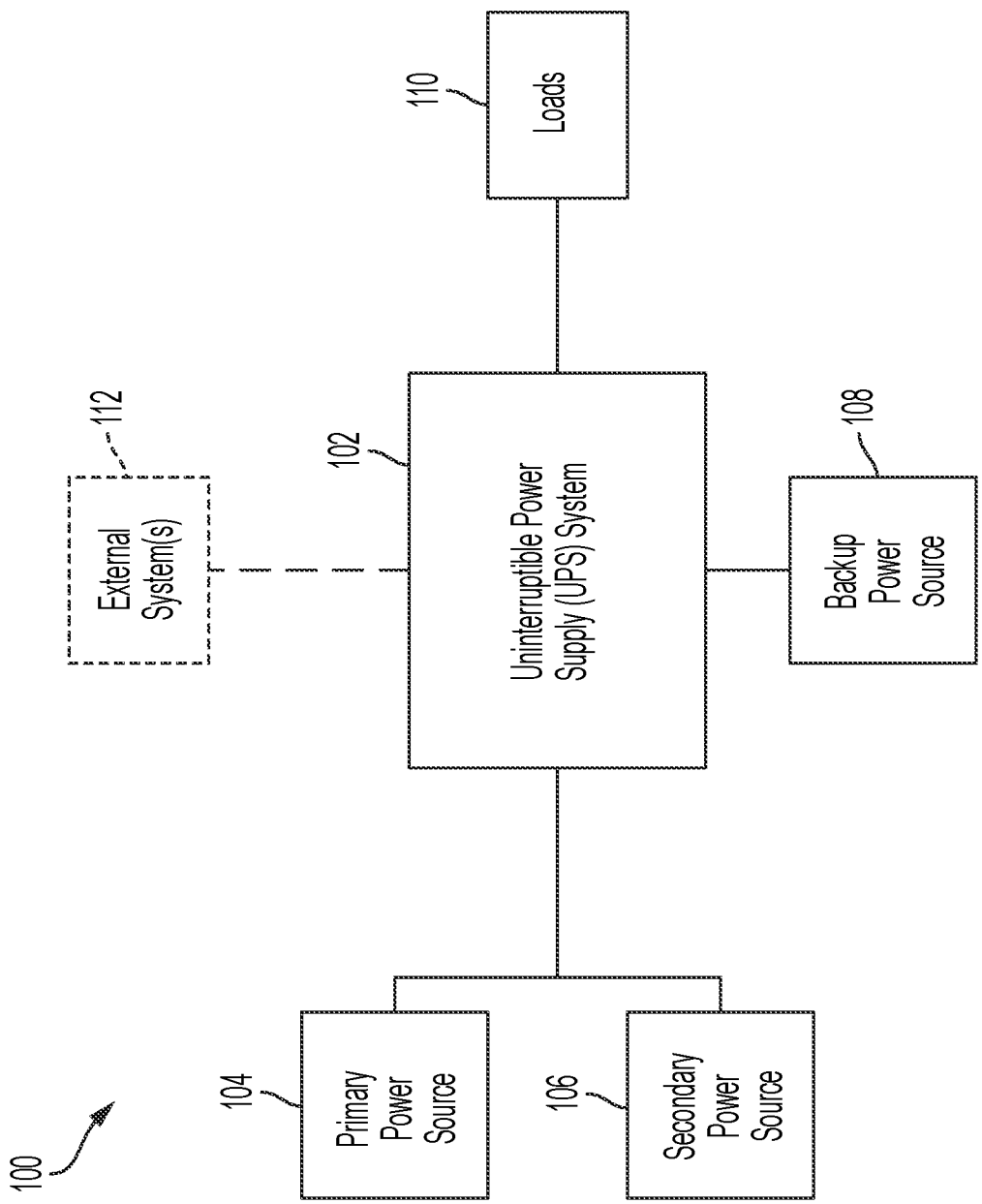
FIG. 1 illustrates a block diagram of a power system according to an example.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purpose only and are not intended to be limiting. Acts, components, elements, and features discussed in connection with any one or more examples are not intended to be excluded from a similar role in other examples.

The phraseology and terminology used herein is for the purpose of description and should not be regarded as limiting. Any reference to examples, embodiments, components, elements, or acts of the systems and methods herein referred to in the singular may also embrace embodiments including a plurality, and any references in the plural to any embodiment, component, element, or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all the described terms. In addition, in the event of inconsistent usages of terms between this document and documents incorporated herein by reference, the term usage in the incorporated features is supplementary to that of this document; for irreconcilable differences, the term usage in this document controls.

Uninterruptible power supplies (UPSs) may be configured to provide uninterrupted power to one or more loads. The loads may be any type of device requiring electrical power, such as servers, computers, medical equipment, and so forth. UPSs may be coupled to a main power source and a backup power source, such as a battery, and may provide power derived from the main power source and/or the backup power source to the one or more loads. For example, a UPS may provide load power derived from the main power source when main power is available and may provide load power derived from the backup power source when main power is not available.

In various examples, a UPS provides power to loads. A UPS may receive power from a primary power source, such as a utility grid, and provide output power derived from the primary power source to the loads. In some examples, when the primary power source is not available (for example, due to a power outage), the UPS may draw power from a different power source to provide power to the loads. In some examples, when the primary power source is unavailable, a secondary power source begins to turn on. Some secondary power sources, such as generators, may not be immediately able to provide output power, and may take several seconds or minutes to start up. As the secondary power source starts up, the UPS may draw power from a backup power source, such as a battery, to provide output power to the loads. Once the secondary power source is available to provide power to the UPS, the UPS may draw power from the secondary power source instead of the backup power source to provide power to the loads.

Accordingly, the backup power source may provide power to the UPS in the interim between the primary power source being unavailable, responsive to which the secondary power source begins to turn on, and the time at which the secondary power source is turned on and prepared to provide power to the UPS. The interim may be referred to as a "changeover time." In some examples, a size of the backup power source (for example, an energy capacity and/or output-power capability) may be selected based on the changeover time. For example, the size of the backup power source may be selected to be able to be able to support 100% of the rated power of the UPS (that is, a maximum rated power of the UPS), or "100% load," for at least the changeover time. In this example, the sizing of the backup power source may ensure that the UPS can power the loads at least until the secondary power source is available to provide power to the UPS, at which point the UPS may draw power from the secondary power source in lieu of the backup power source.

In some examples, the backup power source may still have stored energy remaining at the end of the changeover time. For example, in at least one embodiment where a load does not draw 100% load from the UPS, the backup power source may still have a significant amount of stored energy remaining. In such a situation, it may be advantageous for the UPS to continue drawing power from the backup power source even after the secondary power source is available to provide power to the loads. For example, even if secondary power becomes available, it may be advantageous for the UPS to continue drawing backup power when the load is relatively light, and the backup power source still has a significant amount of stored energy available. Among other advantages, drawing power from the backup power source in lieu of the secondary power source may save fuel where, for example, the secondary power source is a fuel-consuming generator.

Examples described herein include a UPS coupled to a primary and secondary power source, a backup power source, and one or more loads. In various examples, the UPS may continue to provide backup power derived from the backup power source to the loads even after the secondary power source is available. For example, the UPS may continue to provide backup power derived from the backup power source if, upon determining that the secondary power source is available (that is, ready to provide power to the UPS), a load utilization of one or more of the loads on the UPS is below a threshold load level, and an energy level (for example, a state-of-charge [SOC]) of the backup power source is above a first threshold energy level. The UPS may continue to draw power from the backup power source until, for example, the SOC of the backup power source drops below a second threshold energy level, which may be lower than the first threshold energy level. Accordingly, examples provided herein may reduce fuel consumption, amongst other benefits, at least in part by extending an amount of time during which power is drawn from a backup power source.

FIG. 1 illustrates a block diagram of a power system 100 according to an example. The power system 100 includes a UPS 102, a primary power source 104, one or more secondary power sources 106 ("secondary power source 106"), one or more backup power sources 108 ("backup power source 108"), one or more loads 110 ("loads 110"), and, in some examples, one or more optional external systems 112 ("external systems 112").

The primary power source 104 is coupled to, and is configured to provide primary power to, the UPS 102. The secondary power source 106 is coupled to, and is configured to provide secondary power to, the UPS 102. In some examples, the secondary power source 106 may be coupled to, and be configured to provide secondary power to, one or more devices in addition to the UPS 102, which are not illustrated for clarity. The backup power source 108 is coupled to, and is configured to provide backup power to, the UPS 102. The UPS 102 is coupled to, and is configured to draw power from, the primary power source 104, the secondary power source 106, and the backup power source 108 at one or more inputs. The UPS 102 is coupled to, and is configured to provide output power to, the loads 110. In some examples, the UPS 102 is communicatively coupled to the external systems 112. The loads 110 are coupled to, and are configured to draw power from, the UPS 102. In examples in which the external systems 112 are included, the external systems 112 may be communicatively coupled to the UPS 102.

The UPS 102 is configured to provide uninterrupted power to the loads 110. When primary power is available from the primary power source 104, the UPS 102 may draw primary power from the primary power source 104 and provide output power derived from the primary power to the loads 110. The UPS 102 may also recharge the backup power source 108 using power derived from the primary power. If primary power is unavailable from the primary power source 104 (for example, due to a power outage), the UPS 102 may draw backup power from the backup power source 108 instead of drawing primary power from the primary power source 104, and provide output power derived from the backup power to the loads 110.

The UPS 102 may also activate the secondary power source 106 responsive to determining that primary power is unavailable. The secondary power source 106 may include a generator configured to provide secondary power to the UPS 102 when the primary power is unavailable. However, because it may take several seconds or minutes for the secondary power source 106 to start up and be prepared to provide secondary power, the backup power source 108 may supply interim power to the UPS 102 during this "changeover time" from the primary power source 104 to the secondary power source 106. As discussed in greater detail below, the UPS 102 may begin drawing secondary power from the secondary power source 106 once secondary power is available (for example, if the backup power source 108 is significantly depleted of energy), or may instead continue drawing backup power from the backup power source 108 (for example, if the backup power source 108 still stores a significant amount of energy).

Figure 2:
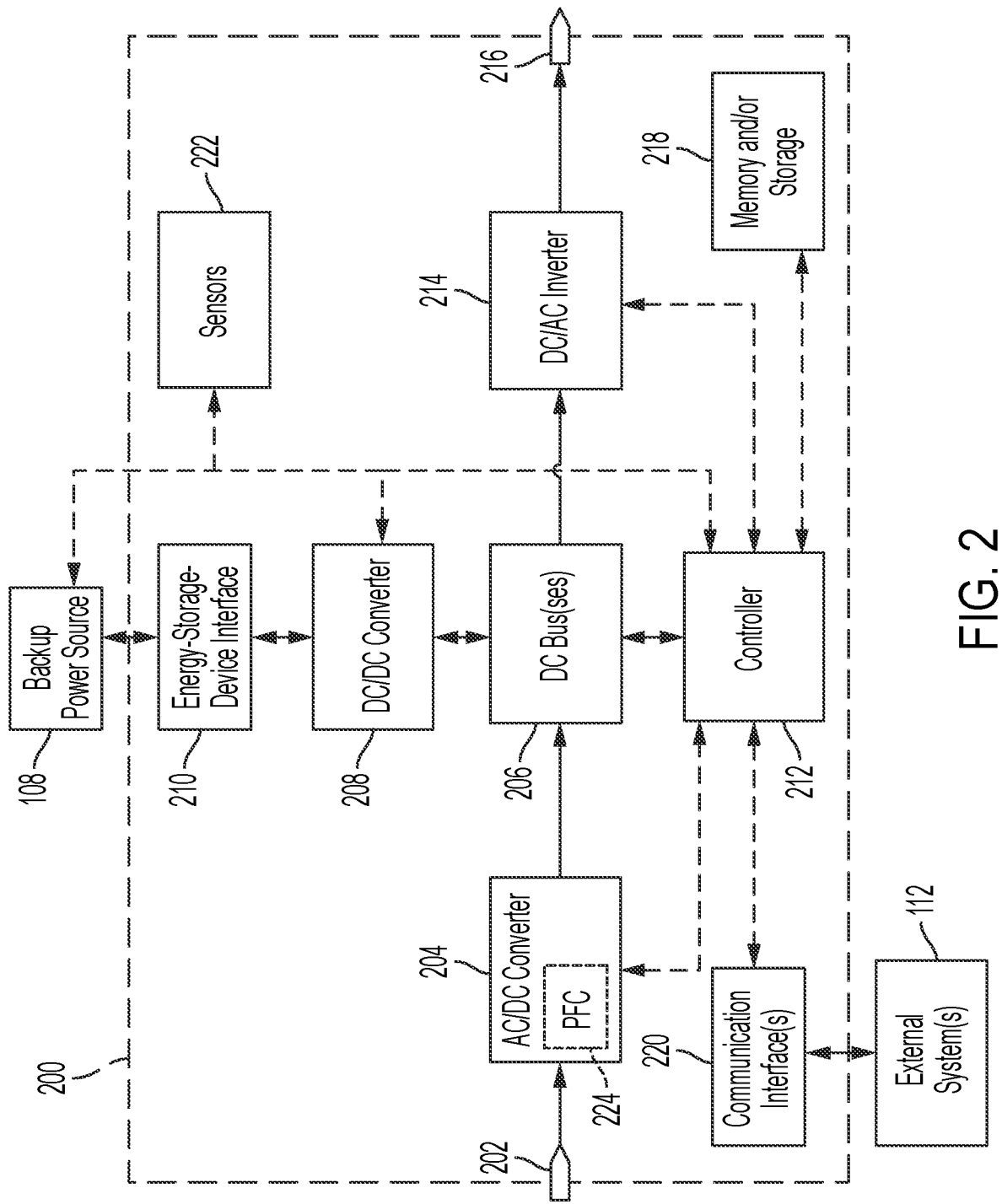
FIG. 2 illustrates a block diagram of an uninterruptible power supply according to an example.

FIG. 2 illustrates a block diagram of a UPS 200 according to an example. For example, the UPS 200 may illustrate an example configuration of the UPS 102. In other examples, the UPS 102 may be implemented differently.

The UPS 200 includes an input 202, an AC/DC converter 204, one or more DC busses 206, a DC/DC converter 208, an energy-storage-device interface 210, at least one controller 212 ("controller 212"), a DC/AC inverter 214, an output 216, memory and/or storage 218, one or more communication interfaces 220 ("communication interfaces 220"), and one or more voltage sensors and/or current sensors 222 ("sensors 222"). The AC/DC converter 204 includes a power-factor-correction circuit 224 ("PFC 224"). The energy-storage-device interface 210 may be coupled to the backup power source 106. The communication interfaces 220 may be communicatively coupled to the external systems 112.

The input 202 is coupled to the AC/DC converter 204 and to an AC power source (not illustrated), such as an AC power supply. For example, the input 202 may be coupled to the primary power source 104 and/or the secondary power source 106. The AC/DC converter 204 is coupled to the input 202 and to the one or more DC busses 206, and is communicatively coupled to the controller 212. The one or more DC busses 206 are coupled to the AC/DC converter 204, the DC/DC converter 208, and to the DC/AC inverter 214, and are communicatively coupled to the controller 212 in some examples. The DC/DC converter 208 is coupled to the one or more DC busses 206 and to the energy-storage-device interface 210, and is communicatively coupled to the controller 212. The energy-storage-device interface 210 is coupled to the DC/DC converter 208, and is configured to be coupled to at least one energy-storage device, such as the backup power source 108 and/or another energy-storage device.

In some examples, the UPS 200 may be external to the at least one backup power source 108 and may be coupled to the at least one backup power source 108 via the energy-storage-device interface 210. In various examples, the UPS 200 may include one or more backup power sources, which may include the backup power source 108. The backup power source 108 may include one or more batteries, capacitors, flywheels, or other energy-storage devices in various examples.

The DC/AC inverter 214 is coupled to the one or more DC busses 206 and to the output 216, and is communicatively coupled to the controller 212. The output 216 is coupled to the DC/AC inverter 214, and to an external load (not pictured). The controller 212 is communicatively coupled to the AC/DC converter 204, the one or more DC busses 206, the DC/DC converter 208, the energy-storage-device interface 210, the DC/AC inverter 214, the memory and/or storage 218, the communication interfaces 220, and the sensors 222. The sensors 222 are communicatively coupled to the controller 212 and may be coupled to one or more other components of the UPS 200, such as the input 202, the AC/DC converter 204, the one or more DC busses 206, the DC/DC converter 208, the energy-storage-device interface 210, the DC/AC inverter 214, and/or the output 216.

In some examples, the sensors 222 may include one or more sensors coupled to one or more of the foregoing components such that a voltage and/or current of one or more of the foregoing components may be determined by the controller 212. The controller 212 may store information in, and/or retrieve information from, the memory and/or storage 218. For example, the controller 212 may store information indicative of sensed parameters (for example, input-voltage values of the AC power received at the input 202) in the memory and/or storage 218. The controller 212 may further receive information from, or provide information to, the communication interfaces 220. The communication interfaces 220 may include one or more communication interfaces including, for example, user interfaces (such as display screens, touch-sensitive screens, keyboards, mice, track pads, dials, buttons, switches, sliders, light-emitting components such as light-emitting diodes, sound-emitting components such as speakers, buzzers, and so forth configured to output sound inside and/or outside of a frequency range audible to humans, and so forth), wired communication interfaces (such as wired ports), wireless communication interfaces (such as antennas), and so forth, configured to exchange information with one or more systems, such as the external systems 112, or other entities, such as human beings. The external systems 112 may include any device, component, module, and so forth, that is external to the UPS 200, such as a server, database, laptop computer, desktop computer, tablet computer, smartphone, central controller or data-aggregation system, other UPS s, and so forth.

The input 202 is configured to be coupled to an AC mains power source and to receive input AC power having an input voltage level. The UPS 200 is configured to operate in different modes of operation based on the input voltage of the AC power provided to the input 202. The controller 212 may determine a mode of operation in which to operate the UPS 200 based on whether the input voltage of the AC power is acceptable. The controller 212 may include or be coupled to one or more sensors, such as the sensors 222, configured to sense parameters of the input voltage. For example, the sensors 222 may include one or more voltage and/or current sensors coupled to the input 202 and being configured to sense information indicative of a voltage at the input 202 and provide the sensed information to the controller 212.

When AC power provided to the input 202 is acceptable (for example, by having parameters, such as an input voltage value, that meet specified values, such as by falling within a range of acceptable input voltage values), the controller 212 controls components of the UPS 200 to operate in a normal mode of operation. In the normal mode of operation, AC power received at the input 202 is provided to the AC/DC converter 204. The AC/DC converter 204 converts the AC power into DC power and provides the DC power to the one or more DC busses 206. The one or more DC busses 206 distribute the DC power to the DC/DC converter 208 and to the DC/AC inverter 214. The DC/DC converter 208 converts the received DC power and provides the converted DC power to the energy-storage-device interface 210. The energy-storage-device interface 210 receives the converted DC power, and provides the converted DC power to the backup power source 108 to charge the backup power source 108. The DC/AC inverter 214 receives DC power from the one or more DC busses 206, converts the DC power into regulated AC power, and provides the regulated AC power to the output 216 to be delivered to a load.

When AC power provided to the input 202 from the AC mains power source is not acceptable (for example, by having parameters, such as an input voltage value, that do not meet specified values, such as by falling outside of a range of acceptable input voltage values), the controller 212 may control components of the UPS 200 to operate in a backup mode of operation. In the backup mode of operation, DC power is discharged from the backup power source 108 to the energy-storage-device interface 210, and the energy-storage-device interface 210 provides the discharged DC power to the DC/DC converter 208. The DC/DC converter 208 converts the received DC power and distributes the DC power amongst the one or more DC busses 206. For example, the DC/DC converter 208 may evenly distribute the power amongst the one or more DC busses 206. The one or more DC busses 206 provide the received power to the DC/AC inverter 214. The DC/AC inverter 214 receives the DC power from the one or more DC busses 206, converts the DC power into regulated AC power, and provides the regulated AC power to the output 216.

Figure 3:
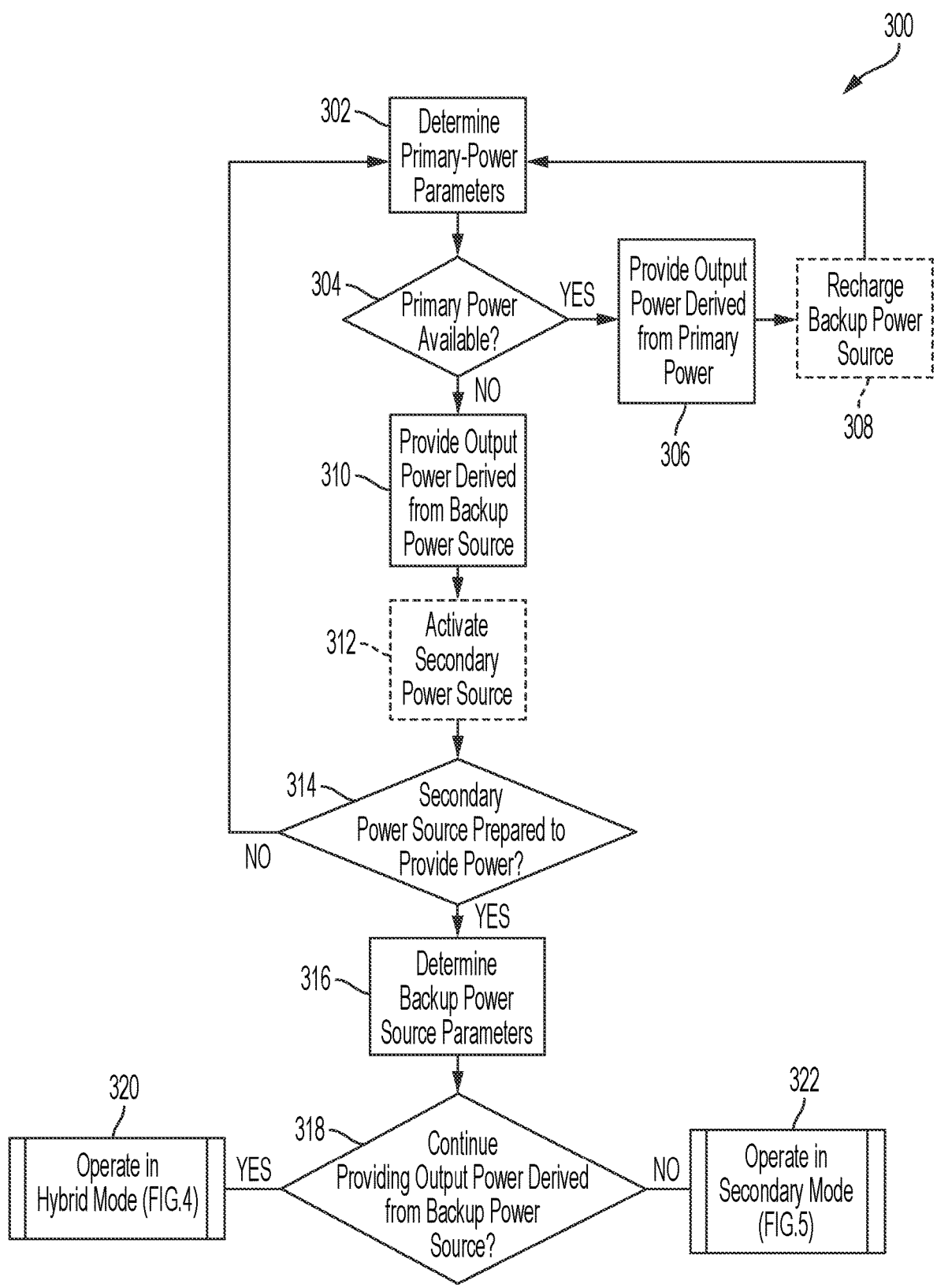
FIG. 3 illustrates a process of operating a power system according to an example.

In some examples, the controller 212 may control components of the UPS 200 to operate in one or more alternate or additional modes of operation, such as a hybrid mode of operation and/or a secondary mode of operation. For example, responsive to the UPS 200 entering the backup power of operation (for example, because the primary power source 104 is unavailable and AC mains power at the input 202 is not acceptable), the secondary power source 106 may begin to turn on. Once the secondary power source 106 is turned on and available to provide secondary power to the input 202, which may take several seconds or minutes, the controller 212 may control the UPS 200 to transition from the backup mode of operation to either the hybrid mode of operation or the secondary mode of operation. In the hybrid mode of operation, the controller 212 may control the UPS 200 to continue drawing backup power from the backup power source 108 even though secondary power is available. In the secondary mode of operation, the controller 212 may control the UPS 200 to stop drawing backup power from the backup power source 108 and instead draw secondary power from the secondary power source 106 at the input 202 responsive to the secondary power being available. FIG. 3, discussed in greater detail below, provides an example of the controller 212 determining whether to enter the hybrid mode of operation or the secondary mode of operation.

FIG. 3 illustrates a process 300 for operating a UPS according to an example. In some examples, the process 300 may be executed at least in part by the controller 212. In some examples, the process 300 may be executed generally by the UPS 102 or the UPS 200 (which, as discussed above, may be an example of the UPS 102). For the purposes of explanation, the process 300 is described as though performed by the controller 212. However, the use of controller 212 is purely illustrative, and in other examples one or more alternate or additional components may execute acts of the process 300 in addition to, or in lieu of, the controller 212.

At act 302, the controller 212 determines one or more operational parameters of the primary power source 104. The operational parameters may alternately be referred to as "primary-power parameters." For example, the controller 212 may determine voltage levels, current levels, voltage frequency, or other information indicative of power provided by the primary power source 104. At least some of the operational parameters, such as voltage, current, and/or frequency parameters, may be received from the sensors 222, which may sense the operational parameters. The controller 212 may use the operational parameters to determine additional information, such as an availability of primary power from the primary power source 104. The controller 212 may also record historical data indicative of the operational parameters, and/or information derived therefrom, such as by storing the operational parameters and/or information derived therefrom in the memory and/or storage 218.

Act 302 may further include the controller 212 collecting one or more operational parameters of other components or devices, such as the secondary power source 106, the backup power source 108, and/or the loads 110. The one or more operational parameters may include parameters identified above, such as voltage levels, current levels, temperature, and so forth, and may alternately or additionally include device-specific parameters, such as a fuel level of the secondary power source 106, an SOC of the backup power source 108, and so forth. The controller 212 may use the operational parameters to determine additional information, such as a load utilization of the loads 110.

At act 304, the controller 212 determines if acceptable primary power is available from the primary power source 104. The primary power may be considered acceptable if the primary power is within specified voltage, current, and/or frequency ranges. The controller 212 may use the operational parameters determined at act 302 to determine whether acceptable primary power is acceptable. If the controller 212 determines that acceptable primary power is available (304 YES), then the process 300 proceeds to act 306.

At act 306, the controller 212 controls the UPS 200 to provide output power derived from the primary power source 104 to the loads 110. As discussed above, the controller 212 may control the AC/DC converter 204 to draw primary power from the input 202, rectify the primary power, and provide the rectified power to the DC/AC inverter 214 via the DC busses 206. The controller 212 may control the DC/AC inverter 214 to draw the rectified power, convert the rectified power to output power, and provide the output power to the loads 110 via the output 216. In some examples, one or more components of the UPS 200 may have been previously deactivated or may not have been previously activated, and act 306 may include re-activating the deactivated components (which may include activating a component for the first time). For example, as discussed in greater detail below, the controller 212 may activate the PFC 224 to provide power derived from the primary power source 104 to the loads 110 and/or backup power source 108. As appreciated by one of ordinary skill in the art, power-factor-correction circuits may include one or more switches configured to be switchably controlled to provide power-factor correction to received power. Activating the PFC 224 may include closing one or more switches in the PFC 224, which may be open while the PFC 224 is deactivated to prevent the PFC 224 from drawing input power, such that primary power may be drawn from the input 202.

Act 306 may further include the controller 212 monitoring the load utilization of the loads 110 and adjusting the amount of output power provided to the loads 110 based on the load utilization. For example, if the load utilization increases from 30% to 60%, the controller 212 may control the UPS 200 to provide more output power to meet the increased load utilization (for example, to provide twice as much power to account for the doubling of the load utilization).

At optional act 308, which may not be executed in some examples, the controller 212 optionally controls the UPS 200 to provide recharging power derived from the primary power to the backup power source 108. For example, the controller 212 may provide recharging power to the backup power source 108 if the backup power source 108 is not fully charged (for example, by having an SOC below a threshold energy level, such as 99%) and the primary power is not all being used to meet output-power requirements of the loads 110. If the controller 212 operates the UPS 200 to provide recharging power to the backup power source 108, the controller 212 may also monitor the SOC of the backup power source 108 and cease providing output power to recharge the backup power source 108 if the SOC rises above a certain energy level (for example, 30%, 50%, 95%, 99%, and so forth), which may represent a fully charged energy level. The controller 212 may also instruct the UPS 200 to provide recharging power to the backup power source 108 to maintain the backup power source 108 at a substantially constant SOC (for example, within a certain range of a target SOC, such as within 0.1%, 0.5%, 1%, and so forth, of a target SOC). The process 300 may then return to act 302. In examples in which optional act 308 is not executed (for example, because the controller 212 determines that the backup power source 108 does not need to be recharged, or recharging power is not available), the process 300 may proceed from act 306 directly to act 302.

Returning to act 304, if the controller 212 determines that primary power is not available (304 NO), the process 300 proceeds to act 310. At act 310, the controller 212 controls the UPS 200 to provide output power derived from backup power provided by the backup power source 108 to the loads 110. The controller 212 may monitor the operational parameters of the backup power source 108 to monitor the SOC, temperature, voltage levels, current levels, and other relevant operational parameters of the backup power source 108. The controller 212 may also monitor the load utilization and operational parameters of the loads 110. The controller 212 may instruct the UPS 200 to adjust the amount of output power provided to the loads 110 in response to changes in the operational parameters of the backup power source 108 or the loads 110. For example, if the load utilization increases from 30% to 60%, the controller may instruct the UPS 200 to provide a proportionally greater amount of backup power derived from the backup power source 108 to the loads 110.

At optional act 312, the controller 212 may provide an activation signal to the secondary power source 106 requesting that the secondary power source 106 activate. For example, where the secondary power source 106 includes a fuel-consuming generator, the controller 212 may provide an activation signal to the generator to activate the generator. Continuing with the example in which the secondary power source 106 includes a generator, the secondary power source 106 may turn on and begin consuming fuel upon turning on. Even upon being activated, however, the secondary power source 106 may not be prepared to provide acceptable secondary power to the UPS 200. For example, the secondary power source 106 may take a certain amount of time (for example, two minutes, three minutes, and so forth) to synchronize with the loads 110, at which time the secondary power source 106 is considered to be capable of providing acceptable secondary power to the UPS 200. The secondary power source 106 may not be able to provide acceptable secondary power to the UPS 200 until the secondary power source 106 is fully synchronized with the loads. For example, the loads may require output power at 60 Hertz (60 Hz) and 120 Volts (120 V), but it may take the secondary power source 106 several minutes to reach the required frequency and voltage level. The controller 212 may monitor the operational parameters of the secondary power source 106 (for example, frequency, temperature, voltage level, current level, fuel consumption rates, fuel reserves, and so forth) before, during, and/or after the secondary power source 106 is capable of providing acceptable secondary power to the UPS 200, also referred to as the secondary power source 106 "coming online."

In some examples, optional act 312 may not be executed or may include additional or alternate acts. In various examples, the secondary power source 106 may independently determine that the secondary power source 106 should be activated without receiving an activation signal from the controller 212, such as by monitoring the primary power source 104 and detecting that primary power is unavailable. In some examples, the secondary power source 106 may already be activated, such as in response to a request for power from another device or system. In various examples, several iterations of the process 300 may be executed between initially determining that primary power is unavailable at act 304 and the secondary power source 106 coming online, but optional act 312 may only be executed on the first iteration since it may be redundant to send subsequent activation signals. Accordingly, the controller 212 may provide an activation signal to the secondary power source 106 at optional act 312 upon initially determining that primary power is unavailable (304 NO), and may not send another activation signal to the secondary power source 106 once the secondary power source 106 is already activated.

At act 314, the controller 212 determines whether the secondary power source 106 is prepared to provide secondary power. The controller 212 may monitor the frequency, voltage levels, current levels, and other operational parameters of the secondary power source 106 to determine whether the secondary power source 106 is prepared to provide power. In some examples, the controller 212 may communicate directly with the secondary power source 106, and the secondary power source 106 may provide a signal to the controller 212 indicating whether the secondary power source 106 is prepared to provide power to the UPS 200. If the controller 212 determines that the secondary power source 106 is not prepared to provide power (314 NO), such as by not receiving a signal from the secondary power source 106 indicating that the secondary power source 106 is prepared to provide secondary power to the UPS 200, the process 300 returns to act 302. If the controller 212 determines that the secondary power source 106 is prepared to provide secondary power (314 YES), then the process 300 proceeds to act 316.

At act 316, the controller 212 determines one or more operational parameters of the backup power source 108. The one or more operational parameters may be indicative of an SOC, current levels, voltage levels, and/or other operational parameters of the backup power source 108. The controller 212 may receive information indicative of the one or more operational parameters from the sensors 222 and/or the backup power source 108 itself. Act 316 may also include the controller 212 determining, in a similar manner, one or more operational parameters of the loads 110, which may include a load utilization. For example, the controller 212 may receive operational-parameter information from the sensors 222, which may be configured to sense output-power information at the output 216.

At act 318, the controller 212 determines whether to continue providing output power derived from the backup power source 108 to the loads 110. In various examples, if the controller 212 does not continue drawing power from the backup power source 108, the controller 212 may instead draw power from the secondary power source 106 since the secondary power source 106 is prepared to provide secondary power to the UPS 200 (314 YES). However, it may be advantageous to continue drawing power from the backup power source 108 (for example, to conserve the fuel of the secondary power source 106) if an energy level of the backup power source 108 is above a threshold energy level, and if a load utilization is below a threshold load level, which may indicate that the backup power source 108 is capable of satisfying the load requirements for a reasonably long amount of time.

To determine whether the energy level of the backup power source 108 is above the threshold energy level, act 318 may include the controller 212 determining an SOC of the backup power source 108 (or "measured SOC") based on the operational parameters of the backup power source 108 and determine whether the measured SOC is above a threshold energy level. For example, the threshold energy level may be 80%, 75%, 50%, or another example SOC level. The controller 212 may also determine a measured load utilization of the loads 110 and determine whether the measured load utilization is below a threshold load level. For example, the threshold load level may be expressed as a percentage of a rated load of the UPS 200, and may be 50%, 60%, 75%, or another example load utilization.

If the controller 212 determines that the measured SOC is above the threshold energy level and the load utilization is below the threshold load level, which may indicate that the backup power source 108 is still capable of meeting the load requirements for a substantial amount of time, then the controller 212 may continue to provide output power derived from the backup power source 108 to the loads 110 (318 YES). The process 300 then continues to act 320.

At act 320, the controller 212 operates the UPS 200 in a hybrid mode of operation. Act 320 may include transitioning from the backup mode of operation to the hybrid mode of operation. In the hybrid mode of operation, the controller 212 may operate the UPS 200 to continue drawing backup power from the backup power source 108 even though secondary power is available from the secondary power source 106. The controller 212 may operate the UPS 200 in the hybrid mode of operation because, for example, the backup power source 108 is still capable of meeting the load requirements for a substantial amount of time. An example of the controller 212 operating the UPS 200 in the hybrid mode of operation is provided below with respect to FIG. 4.

Returning to act 318, if the controller 212 determines that the measured SOC is not above the threshold energy level or the load utilization is not below the threshold load level, then the controller 212 may discontinue drawing backup power from the backup power source 108. The measured SOC being below the threshold energy level and/or the load utilization being above the threshold load level may indicate that the backup power source 108 may not be capable of meeting the load requirements for a substantial amount of time. The controller 212 may therefore control the UPS 200 to instead draw secondary power from the secondary power source 106 to provide output power to the loads 110 (318 NO). The process 300 then continues to act 322.

At act 322, the controller 212 operates the UPS 200 in a secondary mode of operation. Act 322 may include transitioning from the backup mode of operation to the secondary mode of operation. In the secondary mode of operation, the controller 212 may operate the UPS 200 to draw secondary power from the secondary power source 106 in lieu of the backup power source 108 because, for example, the backup power source 108 may not be capable of meeting the load requirements for a substantial amount of time. An example of the controller 212 operating the UPS 200 in the secondary mode of operation is provided below with respect to FIG. 5.

Figure 4:
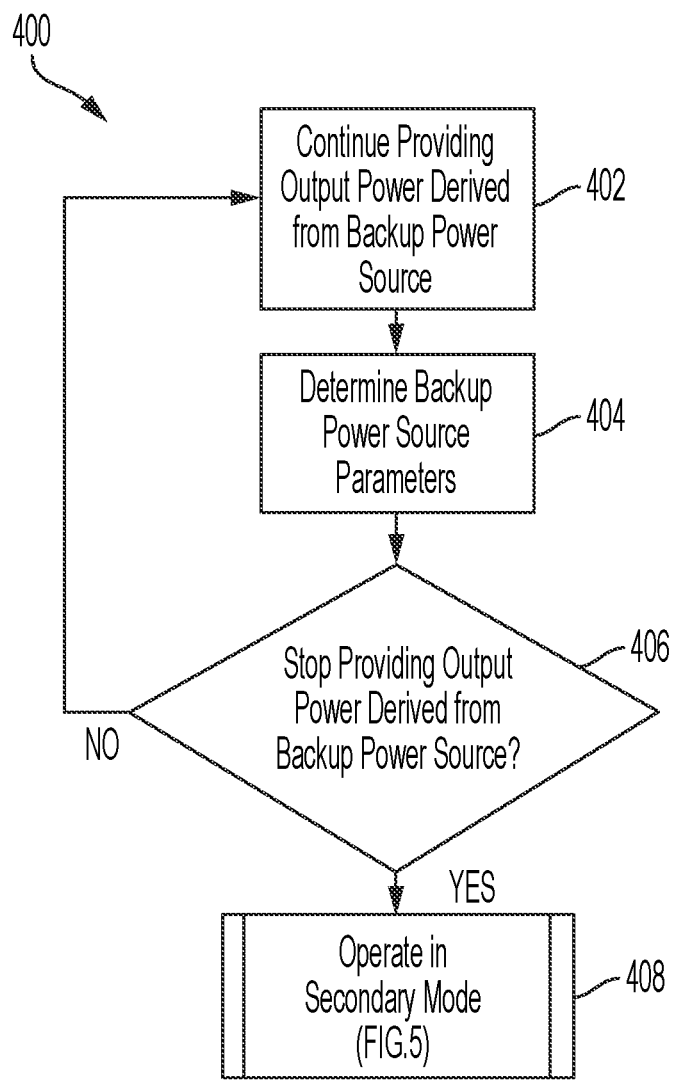
FIG. 4 illustrates a process of operating a power system in a hybrid mode of operation according to an example.

FIG. 4 illustrates a process 400 of operating in a hybrid mode of operation according to an example. During the hybrid mode of operation, the secondary power source 106 may be fully online and prepared to provide secondary power to the UPS 200. As discussed above, however, the controller 212 may continue to operate the UPS 200 to provide output power derived from backup power provided by the backup power source 108, and may not draw secondary power from the secondary power source 106. For example, the controller 212 may disable (or may not enable) the PFC 224, which may be a component of the AC/DC converter 204, such that the UPS 200 does not draw secondary power from the secondary power source 106 via the input 202. During the hybrid mode of operation, the secondary power source 106 may not need to provide power to the loads 110, and thus can conserve fuel.

At act 402, the controller 212 controls the UPS 200 to continue providing output power derived from the backup power source 108 to the loads 110. As discussed above, the controller 212 may have previously been operating the UPS 200 in the backup mode of operation before transitioning to the hybrid mode of operation. Accordingly, the controller 212 may control the DC/DC converter 208 to continue drawing backup power from the backup power source 108 via the energy-storage-device interface 210 once entering the hybrid mode of operation. The controller 212 controls the DC/DC converter 208 to convert the backup power to converted backup power and provide the converted backup power to the DC/AC inverter 214 via the DC busses 206. The controller 212 controls the DC/AC inverter 214 to convert the converted backup power to output power, and provide the output power to the loads 110 via the output 216.

At act 404, the controller 212 determines the operational parameters of the backup power source 108. For example, the controller 212 may determine a measured SOC of the backup power source 108, and/or may also determine other operational parameters, such as voltage levels, current levels, temperature, and so forth. The controller 212 may also determine the load utilization of the loads 110 at act 404 in some examples. In other examples, the controller 212 may not determine the load utilization of the loads 110.

At act 406, the controller 212 determines whether to continue providing output power derived from the backup power source 108 to the loads 110. For example, the controller 212 may determine whether to continue operating in the hybrid mode of operation. As discussed above with respect to act 318, the controller 212 may determine to enter the hybrid mode of operation if, amongst other conditions, a measured SOC of the backup power source 108 is above a threshold energy level. The threshold energy level discussed above with respect to act 318 (that is, a threshold energy level to enter the hybrid mode of operation) may be a first threshold energy level. Determining whether to remain in the hybrid mode at act 406 may include determining whether a measured SOC of the backup power source 108 is above a second threshold energy level, which may be lower than the first threshold energy level of act 318. Whereas the first threshold energy level may indicate a threshold energy level to enter the hybrid mode of operation, the second threshold energy level may indicate a threshold energy level to exit the hybrid mode of operation.

Act 406 may include the controller 212 determining whether the measured SOC of the backup power source 108 is below the second threshold energy level. In one example, whereas the first threshold energy level (that is, a threshold that the backup power source 108 exceeds to enter the hybrid mode of operation) may be approximately 80%, the second threshold energy level (that is, a threshold that the backup power source 108 drops below to exit the hybrid mode of operation) may be approximately 40%. In other examples, other thresholds may be implemented.

If the controller 212 determines that the UPS 200 should remain in the hybrid mode of operation (406 NO), such as by determining that the measured SOC of the backup power source 108 is above the second threshold energy level, the process 400 returns to act 402. Acts 402-406 may be repeated until the controller 212 determines that the UPS 200 should exit the hybrid mode of operation. If the controller 212 determines that the UPS 200 should exit the hybrid mode of operation (406 YES), such as by determining that the measured SOC of the backup power source 108 is below the second threshold energy level, then the process 400 continues to act 408.

At act 408, the controller 212 operates the UPS 200 in the secondary mode of operation. Act 408 may be substantially similar or identical to act 322, except that at act 408, the UPS 200 is transitioning from the hybrid mode of operation rather than the backup mode of operation. As discussed above with respect to act 322, an example of the secondary mode of operation is provided in greater detail with respect to FIG. 5.

Figure 5:
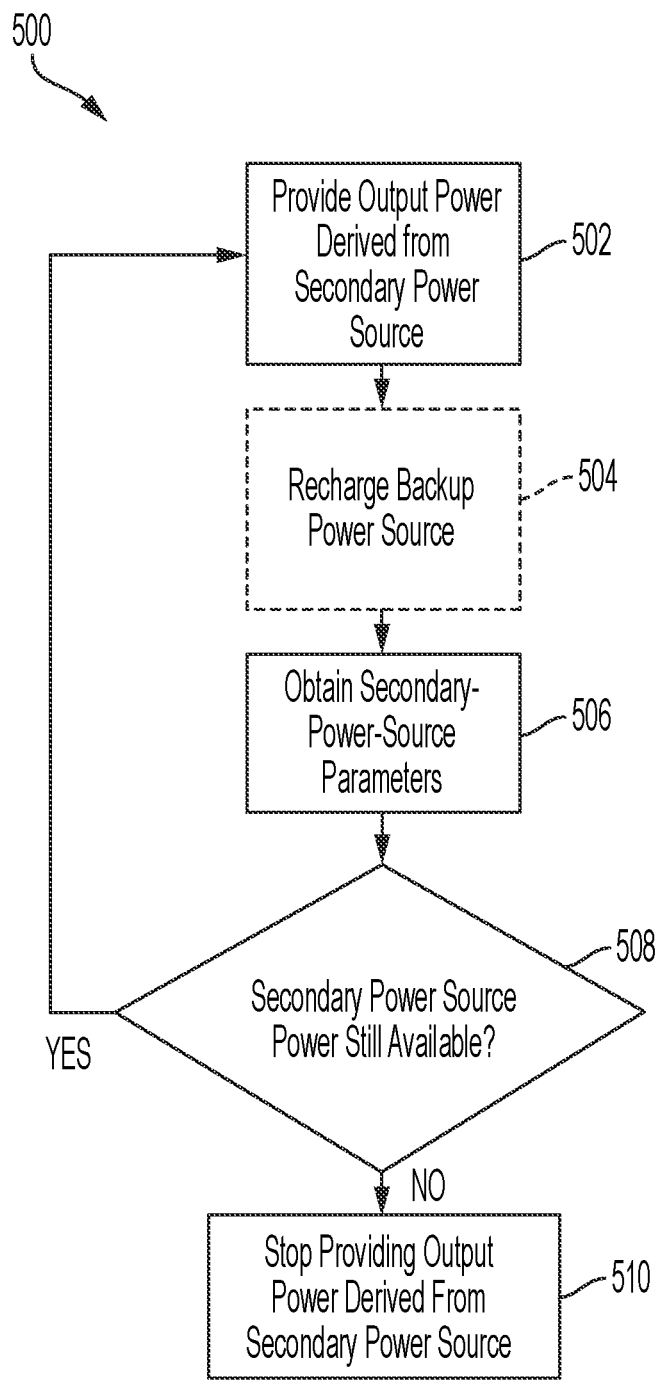
FIG. 5 illustrates a process of operating a power system in a secondary mode of operation according to an example.

FIG. 5 illustrates a process 500 of operating the UPS 200 in a secondary mode of operation according to an example. During the secondary mode of operation, the secondary power source 106 may be fully online and providing secondary power to the UPS 200. During the secondary mode of operation, the backup power source 108 may not provide power to the UPS 200, though in some examples the controller 212 may control the UPS 200 to provide recharging power derived from the secondary power to backup power source 108.

At act 502, the controller 212 controls the UPS 200 to provide output power derived from secondary power to the loads 110. The secondary power source 106 may provide secondary power at the input 202. The controller 212 controls the AC/DC converter 204 to draw the secondary power from the input 202, which may include enabling the PFC 224 of the AC/DC converter 204. The secondary power may be AC power. The controller 212 may control the AC/DC converter 204 to convert the secondary power to DC power and provide the DC power through the DC busses 206 to the DC/AC inverter 214. The controller 212 may control the DC/AC inverter 214 to convert the DC power to AC output power and provide the output power to the loads 110 via the output 216.

At optional act 504, the controller 212 may instruct the UPS 200 to provide recharging power to the backup power source 108 in addition to, or in lieu of, providing output power to the loads 110. The recharging power may be derived from the secondary power provided by the secondary power source 106. Recharging power provided to the backup power source 108 may be used to recharge the backup power source 108, which may increase the SOC of the backup power source 108. The controller 212 may control the AC/DC converter 204 to draw secondary power from the input 202, convert the secondary power to converted secondary power, and provide at least a portion of the converted secondary power to the DC/DC converter 208 via the DC busses 206. A remaining portion of the converted secondary power may be provided to the DC/AC inverter 214 via the DC busses 206, which may be used to provide output power to the loads 110 as discussed above. The controller 212 may control the DC/DC converter 208 to draw the converted secondary power from the AC/DC converter 204, convert the converted secondary power to recharging power, and provide the recharging power to the backup power source 108 via the energy-storage-device interface 210.

In some examples, optional act 504 may not be executed. For example, the controller 212 may determine whether any excess power is available from the secondary power after satisfying the load requirements and, if not, determine that recharging power should not be provided to the backup power source 108 and that act 504 should not be executed. In another example, the controller 212 may determine whether the backup power source 108 is fully charged (as defined by, for example, having an SOC above a full-charge threshold, such as 99%) and, if so, determine that recharging power should not be provided to the backup power source 108 and that act 504 should not be executed. In another example, the controller 212 may determine whether the secondary power source 106 has a sufficient amount of remaining fuel to recharge the backup power source 108. For example, even if the secondary power source 106 is capable of recharging the backup power source 108 and the backup power source 108 is not fully charged, the controller 212 may determine that fuel for the secondary power source 106 should be conserved because the fuel level of the secondary power source 106 is below a threshold fuel level (for example, 5%, 20%, 50%, or another example value), and that act 504 should therefore not be executed. In examples in which act 504 is not executed, the process 500 may continue directly to act 506 from act 502.

At act 506, the controller 212 determines the operational parameters of the secondary power source 106. For example, the controller 212 may determine the fuel levels, voltage and/or current levels, temperature, and/or other characteristics of the secondary power source 106. The controller 212 may also determine the operational parameters of the loads 110, such as load utilization and/or other characteristics.

At act 508, the controller 212 determines whether secondary power is still available from the secondary power source 106. For example, the controller 212 may determine whether a fuel level of the secondary power source 106 is above a threshold fuel level. The threshold fuel level may represent a substantially fully depleted level of fuel, such as 1%, below which the secondary power source 106 no longer provides secondary power. In some examples, the controller 212 may determine that sufficient secondary power is available to continue to provide output power to the loads 110 (508 YES), but not to the backup power source 108. The controller 212 may therefore return to act 502 but not execute optional act 504. The controller 212 may alter a determination based on the load utilization, historical operating data, and so forth. If the controller 212 determines that sufficient secondary power is available (508 YES), the process 500 may return to act 502 and repeat the acts 502-508 as discussed above. If the controller 212 determines that secondary power is no longer available, for example because the secondary power source 106 has insufficient fuel or is otherwise unable to provide acceptable secondary power having an acceptable voltage, current, frequency, or other characteristics (for example, because of overheating or other factors) (508 NO), the process 500 proceeds to act 510.

At act 510, the controller 212 controls the UPS 200 to stop providing output power derived from the secondary power to the loads 110. In some examples, the controller 212 may control the UPS 200 to provide output power derived from backup power provided by the backup power source 108 after discontinuing providing output power derived from the secondary power source 106. For example, the controller 212 may control the UPS 200 to draw backup power from the backup power source 108 if the SOC of the backup power source 108 is above a threshold energy level, such as 0%, 20%, 50%, or other examples, which may be the same as or different than the first and second threshold energy levels.

If the controller 212 determines that secondary power is not available from the secondary power source 106 (for example, because the secondary power source 106 has no remaining fuel) and backup power is not available from the backup power source 108 (for example, because the backup power source 108 is fully discharged), then the UPS 200 may discontinue providing output power to the loads 110.

The UPS 200 may enter a shutdown or lower-power standby mode of operation until power is again available, such as from the primary power source 104 (for example, because a power outage has ceased), the secondary power source 106 (for example, because more fuel was added to the secondary power source 106), and/or the backup power source 108 (for example, because additional or different batteries were added to or replaced the backup power source 108), responsive to which the process 300 may again be executed in the manner discussed above.

In various examples, the processes 400, 500 may be executed as discussed above. Execution of the processes 400, 500 may be interrupted by one or more conditions being met, such as acceptable primary power being available, responsive to which the controller 212 may cease executing the process 400 and/or 500 and initiate execution of the process 300. Although the processes 400, 500 may not explicitly discuss returning to the process 300 if an interrupt condition is met, such as primary power being available, in various examples such interrupt conditions may be implemented and are omitted for clarity of explanation only.

In one or more of the foregoing processes and examples, the external systems 112 may perform services and functions for the power system 100, either at the request of the controller 212 or responsive to other conditions. In some examples, the controller 212 may provide information to the external systems 112 and receive information from the external systems 112 via the communication interface 220. For example, the controller 212 may send and/or receive operational parameters and/or historical operating data to and/or from the external systems 112. The external systems 112 may analyze the operational parameters and/or historical operating data provided by the UPS 102 or the power system 100. The external systems 112 may use algorithms, for example, machine-learning algorithms, to predict the performance of the power system 100 under a variety of operating conditions. For example, the external systems 112 may determine that power outages of the primary power source 104 are anticipated to last a certain amount of time under certain conditions. The external systems 112 may provide recommendations to the power system 100 based on various sets of conditions. For example, the external systems 112 may recommend specific first and second threshold energy levels and/or threshold load levels corresponding to different sets of operating conditions. Likewise, the external systems 112 may recommend a fuel threshold level for the secondary power source 106 corresponding to a point, for example, when the UPS 102 should provide a signal to the loads 110 to begin shutdown procedures in order to safely shutdown, and so forth. In various examples, the controller 212 may execute these operations to determine threshold load and/or energy levels in addition to, in lieu of, and/or in conjunction with the external systems 112.

In one or more of the foregoing processes and examples, the operational parameters may include any relevant operating characteristic of any component of the power system 100. For example, the operational parameters may include, but are not limited to, any or all of the SOC of the backup power source 108, the load utilization of the loads 110, the fuel level(s) of the secondary power source 106, historical operation data of the power system 100 and constituents thereof, such as lengths of primary-power outages, power-usage trends, and so forth. In at least one of the foregoing examples and processes, the load utilization may indicate the amount of power used by the loads 110. For example, the loads could draw 10%, 50%, 100%, or another proportion of the available power that the UPS 200 is rated to provide.

In one or more of the foregoing processes and examples, the controller 212 may determine the operational parameters of components (for example, the AC/DC converter 204, the DC/DC converter 208, the DC/AC inverter 214, the sensors 222, and so forth) in any of a number of ways, including receiving signals from the component directly, through the use of external sensors (which may include one or more of the sensors 222), and/or through other communication with devices that can provide data on the operational parameters of the elements of the power system 100. Furthermore, in one or more of the foregoing processes and examples, the controller 212 may determine, calculate, and/or measure the SOC, load utilization, fuel use, and/or other operational parameters as the instantaneous value of the operational parameter, as a running average over a given interval of time, as an average (for example, an average over the entire operation history of the device, over a certain period of time, over a certain number of data points, and so forth), and/or according to other algorithms and methods, such as weighted averages, daily averages, predicted values, and so forth.

In some examples, any or all of the operational parameters discussed herein may be used to determine whether output power derived from the backup power provided by the backup power source 108 should be provided. For example, if the measured SOC is below the first threshold energy level and above the second threshold energy level while the controller 212 is determining whether to initially enter the hybrid mode of operation at act 318, the controller 212 may determine that output power should not be derived from backup power provided by the backup power source 108. In another example, if the measured SOC is above the first threshold energy level and the second threshold energy level while the controller 212 is determining whether to initially enter the hybrid mode of operation at act 318, but the load utilization is above a threshold load level, the controller 212 may determine that output power should not be derived from the backup power provided by the backup power source 108. In at least some examples, for the controller 212 to determine to enter the hybrid mode of operation at act 318, the measured SOC of the backup power source 108 must be above both the first and second threshold energy level, and the load utilization must be below the threshold load level. Any combination of the aforementioned criteria may be used, and the examples given herein are intended to illustrate possible combinations, but do not foreclose unenumerated combinations. In addition to the foregoing, in some examples the controller 212 may use other operational parameters in determining whether to enter the hybrid mode of operation at act 318. For example, the controller 212 may monitor a temperature of the backup power source 108, and determine that output power should not be derived from backup power provided by the backup power source 108 if the temperature of the backup power source 108 exceeds a threshold temperature. Likewise, the controller 212 may monitor changes in load utilization, power consumption, and so forth, to determine whether to provide output power derived from the backup power provided by the backup power source 108.

In some cases, the controller 212 may also compare historical operation data to the present conditions under which the power system 100 is operating to adjust one or more of the first threshold energy level, the second threshold energy level, the threshold load level, and so forth. As discussed above, the threshold energy levels and/or threshold load level may be modified by the controller 212, the external systems 112, or a combination thereof.

Various controllers, such as the controller 212, may execute various operations discussed above. Using data stored in associated memory and/or storage, the controller 212 also executes one or more instructions stored on one or more non-transitory computer-readable media, which the controller 212 may include and/or be coupled to, that may result in manipulated data. In some examples, the controller 212 may include one or more processors or other types of controllers. In one example, the controller 212 is or includes at least one processor. In another example, the controller 212 performs at least a portion of the operations discussed above using an application-specific integrated circuit tailored to perform particular operations in addition to, or in lieu of, a general-purpose processor. As illustrated by these examples, examples in accordance with the present disclosure may perform the operations described herein using many specific combinations of hardware and software and the disclosure is not limited to any particular combination of hardware and software components. Examples of the disclosure may include a computer-program product configured to execute methods, processes, and/or operations discussed above. The computer-program product may be, or include, one or more controllers and/or processors configured to execute instructions to perform methods, processes, and/or operations discussed above.

In various examples, the secondary power source 106 may be any type of energy-storage and/or -conversion device, including, for example, portable generators, natural-gas generators, liquid (for example, gasoline, diesel, and so forth) generators, solar systems (including, for example, solar panels), wind turbines, capacitors, batteries, fuel cells (for example, hydrogen fuel cells), thermoelectric power sources, hydroelectric power sources, coal power sources, and so forth.

In light of the foregoing, example power systems comprising a primary power source, a secondary power source, a UPS, a backup power source, and one or more loads have been disclosed. In some examples, the UPS provides output power derived from primary power to the loads when primary power is available, and provides output power derived from backup power or secondary power to the loads when primary power is unavailable. In some examples, the UPS derives output power from the backup power source even when secondary power is available if, for example, a load utilization is sufficiently low and an SOC of the backup power source is sufficiently high once the secondary power source comes online. The UPS may thus reduce operation of the secondary power source and may thereby conserve fuel in the secondary power source.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. An uninterruptible power supply (UPS) system comprising:
    at least one first input configured to be coupled to a primary power source and to a secondary power source;
    a second input configured to be coupled to a backup power source;
    an output configured to be coupled to at least one load; and
    at least one controller configured to:
        receive a signal indicating that the secondary power source is prepared to provide secondary power to the UPS system;
        determine, responsive to receiving the signal, whether an energy level of the backup power source is above a threshold energy level; and
        control, responsive to determining that the energy level of the backup power source is above the threshold energy level, the UPS system to provide output power derived from the backup power source and not from the secondary power source to the output.

2. The UPS system of claim 1, the at least one controller being further configured to control, responsive to determining that the energy level of the backup power source is below the threshold energy level, the UPS system to provide power derived from the secondary power source to the output.

3. The UPS system of claim 1, further comprising a power-factor-correction circuit (PFC) coupled to the at least one first input, wherein the at least one controller is further configured to control, responsive to determining than the energy level of the backup power source is above the threshold energy level, the PFC to be in a deactivated state.

4. The UPS system of claim 3, the at least one controller being further configured to control, responsive to determining that the energy level of the backup power source is below the threshold energy level, the PFC to be in an activated state.

5. The UPS system of claim 1, wherein the at least one controller is further configured to:
    determine a power drawn by the at least one load; and
    control the UPS system to provide output power derived from the backup power source to the at least one load responsive to:
        receiving the signal,
        determining that the energy level of the backup power source is above the threshold energy level, and
        determining that the power drawn by the at least one load is below a threshold load level.

6. The UPS system of claim 1, wherein the threshold energy level is a first threshold energy level, and wherein the at least one controller is further configured to control, responsive to determining that the energy level of the UPS system is below a second threshold energy level, the UPS system to discontinue providing output power derived from the backup power source to the at least one load and to begin providing output power derived from the secondary power source to the at least one load.

7. The UPS system of claim 6, wherein the at least one controller is further configured to update at least one of the first threshold energy level or the second threshold energy level based on at least one operational parameter of the UPS system.

8. A non-transitory computer-readable medium storing sequences of computer-executable instructions for operating an uninterruptible power supply (UPS) system having at least one first input coupled to a primary power source and a secondary power source, a second input coupled to a backup power source, and an output, the sequences of computer-executable instructions including instructions that instruct at least one processor to:
    determine, responsive to receiving a signal indicating that the secondary power source is prepared to provide secondary power to at least one load, an energy level of the backup power source;

determine, responsive to receiving the signal, whether the energy level of the backup power source is above a threshold energy level; and control, responsive to determining that the energy level of the backup power source is above the threshold energy level, the UPS system to provide output power derived from the backup power source and not from the secondary power source to the at least one load.

9. The non-transitory computer-readable medium of claim 8, the instructions further instructing the at least one processor to control the UPS system, responsive to determining that the energy level of the backup power source is below the threshold energy level, to provide power derived from the secondary power source to the output.

10. The non-transitory computer-readable medium of claim 8, the instructions further instructing the at least one processor to disable, responsive to determining that the energy level of the backup power source is above the threshold energy level, a power factor correction circuit (PFC) coupled to the at least one first input.

11. The non-transitory computer-readable medium of claim 10, the instructions further instructing the at least one processor to enable the PFC responsive to determining that the energy level of the backup power source is below the threshold energy level.

12. The non-transitory computer-readable medium of claim 8, the instructions further instructing the at least one processor to:

determine a power drawn by the at least one load; and
control the UPS system to provide output power derived from the backup power source to the output responsive to:
receiving the signal indicating that the secondary power source is prepared to provide power to the at least one load,
determining that the energy level of the backup power source is above the threshold energy level, and
determining that the power drawn by the at least one load is below a threshold load level.

13. The non-transitory computer-readable medium of claim 8, wherein the threshold energy level is a first threshold energy level, the instructions further instructing the at least one processor to control, responsive to determining that the energy level of the UPS system is below a second threshold energy level, the UPS system to:

discontinue providing power derived from the backup power source to the at least one load; and
provide power derived from the secondary power source to the at least one load.

14. The non-transitory computer-readable medium of claim 13, the instructions further instructing the at least one processor to update at least one of the first threshold energy level or the second threshold energy level based on at least one operational parameter of the UPS system.

15. A method for operating an uninterruptible power supply (UPS) system having at least one first input configured to be coupled to a primary power source and to a secondary power source, a second input configured to be coupled to a backup power source, and an output configured to be coupled to at least one load, the method comprising:

receiving a signal indicating that the secondary power source is prepared to provide secondary power to the at least one first input;
determining, responsive to receiving the signal, whether an energy level of the backup power source is above a threshold energy level; and
providing, responsive to determining that the energy level of the backup power source is above the threshold energy level, output power derived from the backup power source and not from the secondary power source to the output.

16. The method of claim 15, the method further comprising providing power derived from the secondary power source to the output responsive to determining that the energy level of the backup power source is below the threshold energy level.

17. The method of claim 15, the method further comprising deactivating a power factor correction circuit (PFC) coupled to the at least one first input responsive to determining that the energy level of the backup power source is above the threshold energy level.

18. The method of claim 17, the method further comprising enabling the PFC responsive to determining that the energy level of the backup power source is below the threshold energy level.

19. The method of claim 15, the method further comprising:

determining a power drawn by the at least one load; and
providing output power derived from the backup power source to the output responsive to:
receiving the signal,
determining that the energy level of the backup power source is above the threshold energy level, and
determining that the power drawn by the at least one load is below a threshold load level.

20. The method of claim 15, wherein the threshold energy level is a first threshold energy level, the method further comprising:

discontinuing, responsive to determining that the energy level of the UPS system is below a second threshold energy level, providing power derived from the backup power source to the at least one load; and
providing output power derived from the secondary power source to the at least one load.

21. The method of claim 20, the method further comprising updating at least one of the first threshold energy level or the second threshold energy level based on at least one operational parameter of the UPS system.

* * * * *